US009110252B2

(12) United States Patent
Zhou et al.

(10) Patent No.: US 9,110,252 B2
(45) Date of Patent: Aug. 18, 2015

(54) ADAPTIVE DEVICE FOR INSPECTING ENDFACES OF FIBER-OPTIC CONNECTOR HAVING MULTIPLE ROWS OF FIBERS

(75) Inventors: Ge Zhou, Renton, WA (US); Shangyuan Huang, Kent, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 572 days.

(21) Appl. No.: 13/598,507

(22) Filed: Aug. 29, 2012

(65) Prior Publication Data

US 2014/0063598 A1   Mar. 6, 2014

(51) Int. Cl.
*G02B 6/00* (2006.01)
*G02B 6/38* (2006.01)
*G02B 21/00* (2006.01)
*G02B 27/00* (2006.01)
*G02B 6/36* (2006.01)

(52) U.S. Cl.
CPC .............. *G02B 6/3866* (2013.01); *G02B 6/385* (2013.01); *G02B 21/0016* (2013.01); *B08B 2240/02* (2013.01); *G02B 6/3672* (2013.01); *G02B 6/3885* (2013.01); *G02B 21/00* (2013.01); *G02B 21/0004* (2013.01); *G02B 21/0008* (2013.01); *G02B 27/0006* (2013.01)

(58) Field of Classification Search
CPC ...... G02B 6/385; G02B 27/006; G02B 21/00; G02B 21/0004; G02B 21/0008; G02B 21/0016; B08B 2240/02
USPC ...................... 385/133–134, 90; 359/362–392
See application file for complete search history.

(56) References Cited

U.S. PATENT DOCUMENTS

| 5,459,564 | A  | * | 10/1995 | Chivers ...................... 356/73.1 |
| 5,724,127 | A  | * | 3/1998  | Csipkes et al. ............... 356/73.1 |
| 5,731,893 | A  | * | 3/1998  | Dominique ................... 359/379 |
| 6,466,366 | B1 | * | 10/2002 | Dominique ................... 359/379 |
| 6,751,017 | B2 | * | 6/2004  | Cassady ....................... 359/382 |
| 6,879,439 | B2 | * | 4/2005  | Cassady ....................... 359/382 |
| 7,239,788 | B2 | * | 7/2007  | Villeneuve .................... 385/134 |
| 7,336,884 | B2 | * | 2/2008  | Zhou et al. .................... 385/134 |
| 7,684,031 | B2 | * | 3/2010  | Yokota et al. ............... 356/237.1 |
| 8,104,976 | B2 | * | 1/2012  | Zhou et al. ...................... 385/89 |
| 2003/0179447 | A1 | * | 9/2003 | Cassady ....................... 359/391 |
| 2004/0013370 | A1 | * | 1/2004 | Gerhard ......................... 385/85 |
| 2004/0156099 | A1 | * | 8/2004 | Cassady ....................... 359/368 |
| 2004/0213537 | A1 | * | 10/2004 | Villeneuve .................... 385/134 |

(Continued)

*Primary Examiner* — Ryan Lepisto
*Assistant Examiner* — Guy Anderson
(74) *Attorney, Agent, or Firm* — Pai Patent & Trademark Law Firm; Chao-Chang David Pai

(57) ABSTRACT

A device for shifting the imaging axis of a microscope for inspecting endfaces of a fiber-optic connector having multiple rows of endfaces has a supporting body for receiving a microscope; a first swinging lever mounted on top of the supporting body and rotatable about a first swinging axis perpendicular to the imaging axis of the microscope; a first connecting piece extending from the first swinging lever towards the imaging axis; a second swinging lever pivoted on the first connecting piece and rotatable about a second swinging axis perpendicular to the first swinging axis; and a fitting tip connected to the second swinging lever for interfacing with the fiber-optic connector. Using two sets of biasing means and adjustment drivers, the imaging axis passing through the supporting body and the fitting tip can be shifted in two mutually perpendicular directions to selectively align with any endface of the fiber-optic connector.

18 Claims, 13 Drawing Sheets

(56) References Cited

U.S. PATENT DOCUMENTS

| | | | |
|---|---|---|---|
| 2008/0019656 A1* | 1/2008 | Zhou et al. | 385/136 |
| 2008/0088833 A1* | 4/2008 | Yokota et al. | 356/237.5 |
| 2009/0316143 A1* | 12/2009 | Yokota et al. | 356/237.5 |
| 2010/0290744 A1* | 11/2010 | Zhou et al. | 385/89 |
| 2014/0063598 A1* | 3/2014 | Zhou et al. | 359/368 |
| 2015/0092043 A1* | 4/2015 | Baribault | 348/125 |

* cited by examiner

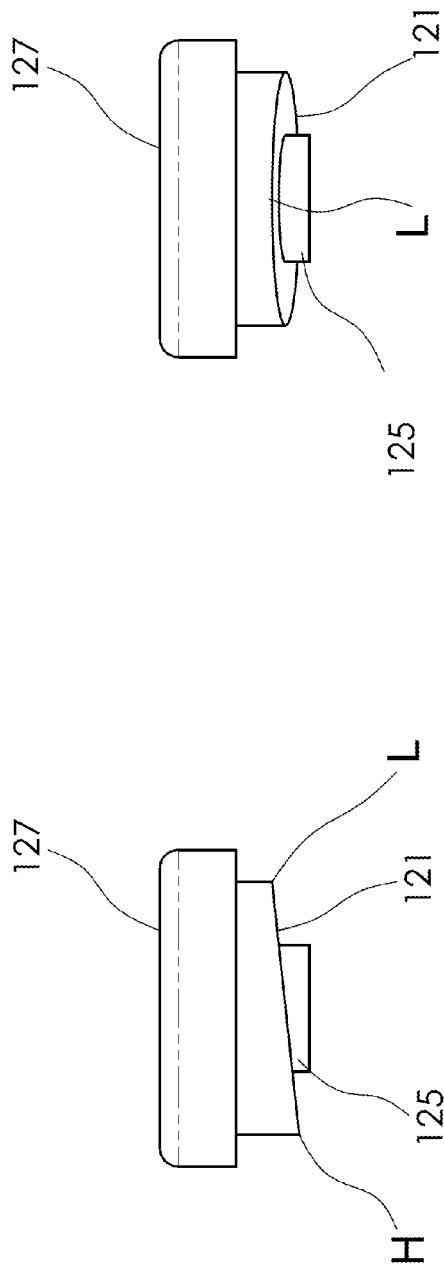
FIG. 5B
FIG. 5A
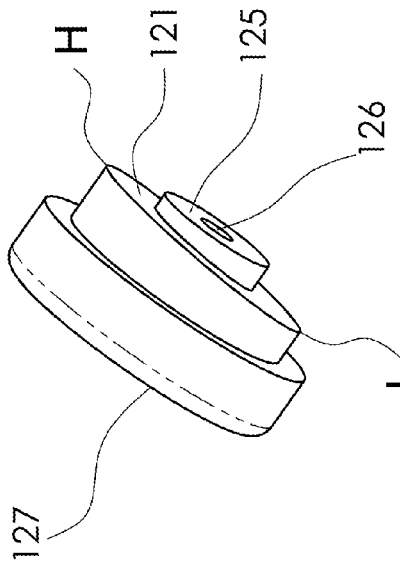
FIG. 5D
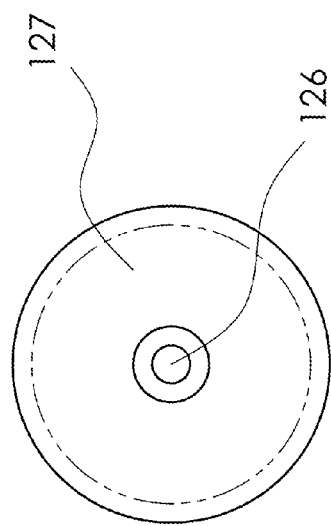
FIG. 5C

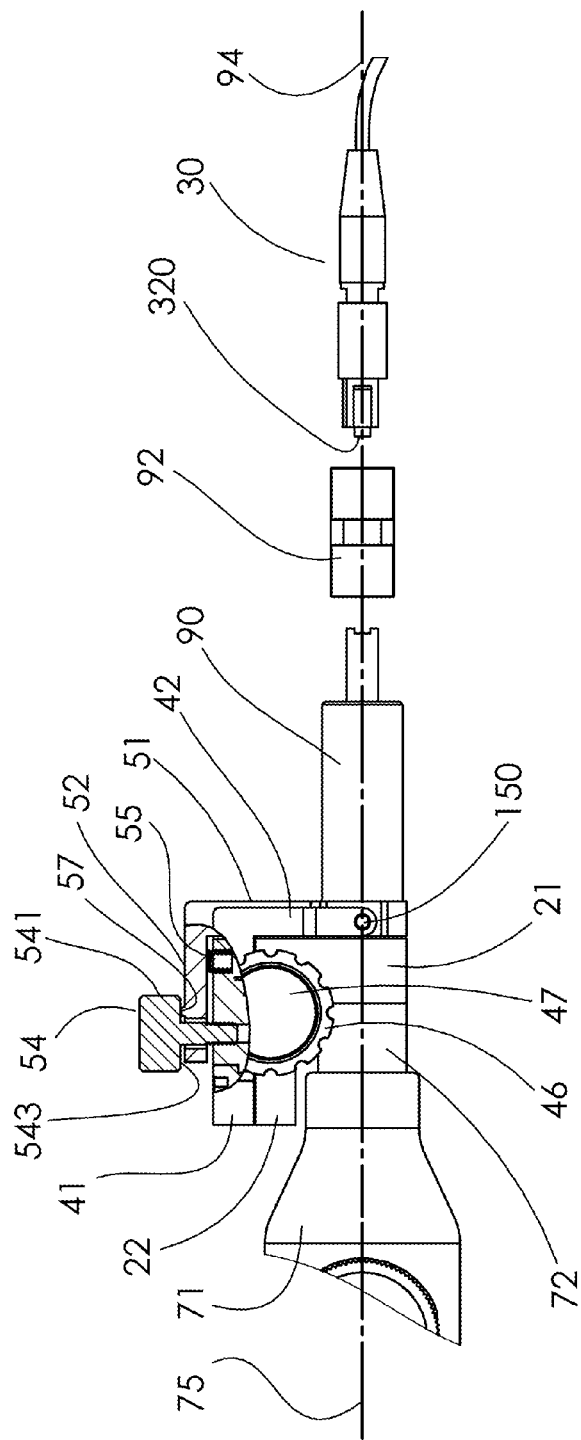
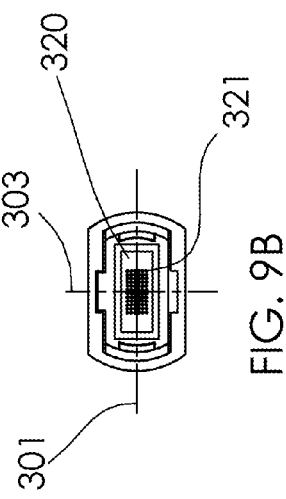
FIG. 9A
FIG. 9B

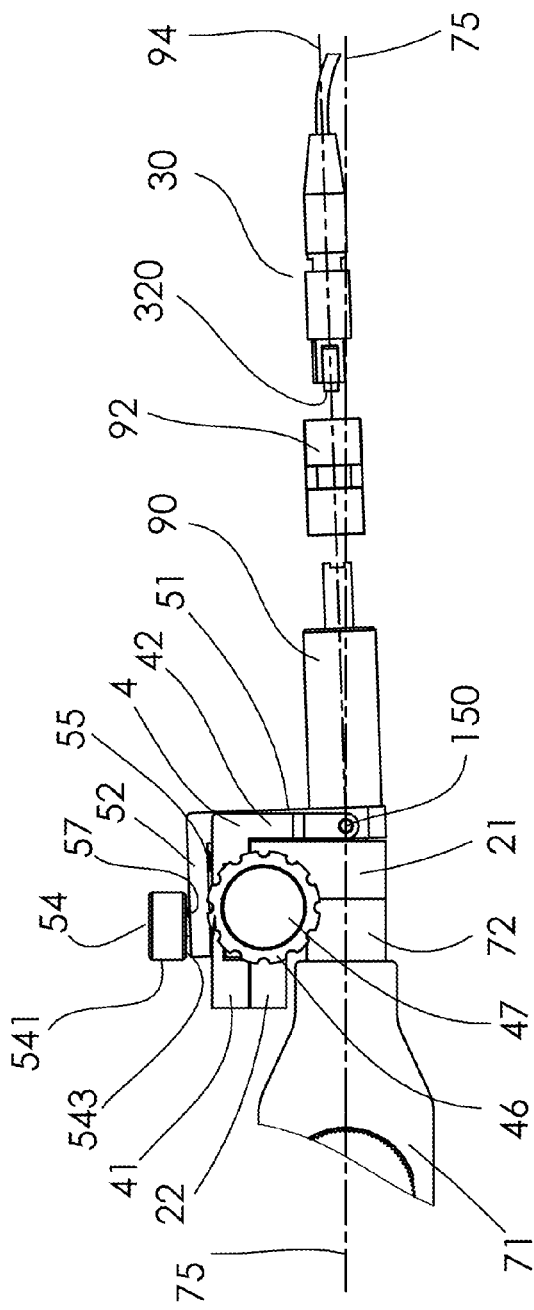
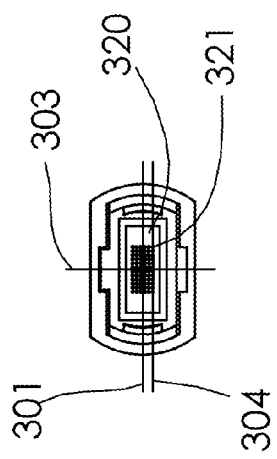
FIG. 10A
FIG. 10B

ADAPTIVE DEVICE FOR INSPECTING ENDFACES OF FIBER-OPTIC CONNECTOR HAVING MULTIPLE ROWS OF FIBERS

BACKGROUND OF THE INVENTION

1. Field of the Invention

The invention relates to fiber-optic connector inspection microscopes and more particularly to an inspection microscope with an adaptive device, which allows the imaging axis of the microscope to be shifted in two mutually perpendicular directions, for inspecting individual endfaces of a fiber-optic connector having the endfaces arranged in multiple rows and multiple columns.

2. Description of the Related Art

The widespread implementation of fiber-optic communications for high-density interconnections has driven more and more multi-fiber connectors to be adopted in the industry. This creates an urgent need for regularly inspecting and maintaining the multi-fiber connectors in place, which are often situated behind backplanes or in locations which are very difficult to access.

It is well known in the fiber-optic communication industry that the endfaces of optical fibers within communication systems must be kept clean and undamaged, otherwise serious signal loss could result. The demand for cleanliness for fiber-optic endfaces has become even more stringent as the communication bandwidths increase and new communication technologies requiring higher laser power are applied.

Many types of microscopes are already available for inspecting endfaces of a fiber-optic connector to make sure the endfaces are undamaged and clean. Due to the need for sufficient magnification, the endfaces are typically inspected only one or two at a time. For a multi-fiber connector having optical fibers arranged in a single row, with the centers of the endfaces spaced typically at 0.25 mm, the microscope must be able to scan from one side to the other side of the connector in order to inspect each of the fiber-optic endfaces. Lately, multi-fiber connectors with optical fibers arranged in multiple rows (up to 6 rows and 12 optical fibers per row) have been developed and gradually adopted in the fiber-optics industry. For such multi-row fiber-optic connectors, the microscope must be able to shift its imaging axis, not only from side to side within each row but also from row to row, in order for all the endfaces to be inspected.

Cassady (U.S. Pat. Nos. 6,751,017 and 6,879,439) discloses a microscope for inspecting fiber-optic endfaces in a (single row) multi-fiber connector. The microscope comprises a slider assembly, a slider chassis and a drive assembly, in which the driver assembly interfaced with the slider assembly is capable of selectively displacing the slider chassis along an axis of motion to selectively direct the imaging axis of the microscope between adjacent fiber-optic endfaces.

U.S. Pat. No. 7,336,884 (to Zhou et al.) provides an adaptive device for inspecting fiber-optic endfaces arranged in a single row through the microscope. The device comprises a supporting body; a pendular arm rotatably mounted to the supporting body; a fitting tip attached to the pendular arm; and a bevel wheel fastened to the supporting body. The bevel wheel is adapted to swing the pendular arm relative to the supporting body so that the imaging axis of the microscope is shifted relative to the fitting tip to selectively align with the endfaces for inspection. However, with this device, the imaging axis of the microscope moves along a circular track relative to the fitting tip and may not be aligned with the center of some of the endfaces in a (single-row) multi-fiber connector.

U.S. Pat. No. 8,104,976 to Zhou et al. discloses an improved adaptive device for shifting the imaging axis of the microscope in a straight line over the endfaces of a single-row multi-fiber connector for inspecting the endfaces. The adaptive device is capable of bringing each endface of the multi-fiber connector into the field of view of the microscope for inspection. More specifically, the adaptive device comprises an adjustment driver and a swinging lever connected to a fitting tip, wherein the adjustment driver is adapted to swing the optical tube of the microscope relative to the swinging lever, thereby selectively shifting the imaging axis of the microscope relative to the fitting tip along a straight-line over the endfaces of a single-row multi-fiber connector interfaced with the fitting tip.

However, none of the inspection microscopes mentioned above are capable of shifting the microscope's imaging axis from one row of endfaces to another for selectively inspecting the endfaces of a multi-fiber connector having multiple rows of endfaces.

Therefore, an improved adaptive device for inspecting endfaces of a multi-row fiber-optic connector is needed, wherein the imaging axis of the microscope can be shifted relative to the fitting tip in two mutually perpendicular directions, so that the imaging axis can be precisely aligned with the center of each and every endface in the multi-row fiber-optic connector.

BRIEF SUMMARY OF THE INVENTION

This invention provides a device for shifting the imaging axis of a microscope in two mutually perpendicular directions relative to the endfaces of a fiber-optic connector having multiple rows of optical fibers to selectively align the imaging axis with the endfaces so that the endfaces can be brought into the field of view of the microscope for inspection.

The adaptive device comprises a supporting body having a passageway for receiving the optical tube of a microscope, a first swinging structure comprising a first swinging lever and a first connecting piece, a second swinging structure comprising a second swinging lever and optionally a second connecting piece, and a fitting tip connected to a passageway in the second swinging lever. The passageway of the second swinging lever is in alignment with the passageway of the supporting body such that the imaging axis of the microscope passes through the passageway of the supporting body, the passageway of the second swinging lever and the internal channel of the fitting tip.

The rear end of the first swinging lever is rotatably mounted to the top side of the supporting body, such that the first swinging lever is rotatable relative to the supporting body about a first swinging axis that is perpendicular to the imaging axis of the microscope. The first connecting piece is connected to the front end of the first swinging lever and extends in front of the supporting body towards the imaging axis of the microscope. A recess is formed on the front side of the first connecting piece, and the second swinging lever is pivotally mounted to the first connecting piece and received in the recess of the first connecting piece, such that the second swinging lever is rotatable about a second swinging axis that is parallel to a normal plane of the first swinging axis. The fitting tip is adapted for interfacing with a fiber-optic connector for the imaging axis passing through the fitting tip to intersect with the endfaces of the fiber-fiber connector.

A first biasing means (such as a spring) and a first adjustment driver (such as a bevel wheel) are disposed between the supporting body and the first swinging lever to interact with them for rotationally shifting the first swinging lever about the first swinging axis relative to the supporting body, thus allowing the imaging axis to be shifted along a straight line horizontally within a certain range.

A second biasing means (such as a spring) and a second adjustment driver (such as an adjustment knob) are disposed between the first swinging structure and the second connecting piece (or the second swinging lever) to interact with them for rotationally shifting the second swinging lever about the second swinging axis relative to the first connecting piece, thus moving the imaging axis of the microscope relative to the fitting tip along a straight line vertically with a certain range.

Thus, by means of the first adjustment driver and the second adjustment driver, a user of the adaptive device can shift the imaging axis of the microscope horizontally and vertically to selectively align with any endface of a fiber-optic connectors with multiple rows of endfaces for inspection.

BRIEF DESCRIPTION OF THE DRAWINGS

FIGS. 5A-5D show various views of the bevel wheel with a slanted surface for the adaptive device for shifting the imaging axis in a horizontal direction.

FIGS. 9-11 illustrate the operation of the second swinging lever in shifting the imaging axis from row to row (in a vertical direction), showing the fitting tip at a horizontal position, tilted upwards and tilted downwards, respectively.

DETAILED DESCRIPTION OF THE INVENTION

Figure 1:
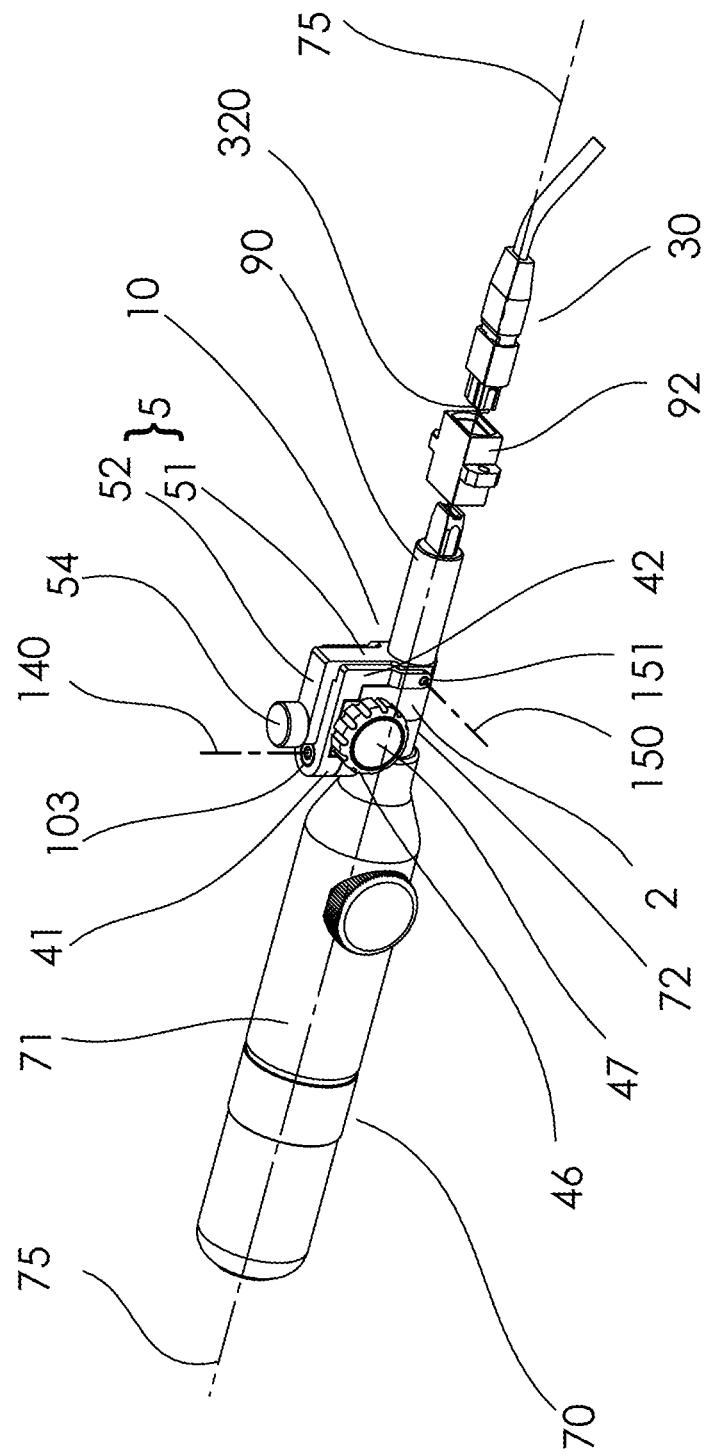
FIG. 1 illustrates a preferred embodiment of the adaptive device according to the present invention for shifting the imaging axis of a microscope in two mutually perpendicular directions for inspecting the endfaces of a fiber-optic connector in which the endfaces are arranged in multiple rows, the adaptive device being shown with a microscope, a multi-fiber connector and a connector adaptor.

FIG. 1 illustrates the adaptive device 10 according to a preferred embodiment of the present invention for shifting the imaging axis of a microscope 70 connected to the adaptive device 10 in two mutually perpendicular directions for inspecting the endfaces of a multi-fiber connector 30 having multiple rows of multiple endfaces (hereinafter "multi-row connector"). In FIG. 1, the adaptive device 10 is shown with a handheld microscope 70, a multi-row connector 30 and a connector adaptor 92 interfacing between the adaptive device 10 and the multi-row connector 30. The microscope 70 has a microscope body 71 and an optical tube 72 at the front end of the microscope body 71 for connecting to the adaptive device 10. The imaging axis 75 of the microscope 70, which passes through the center of the field of view of the microscope 70, is also shown in FIG. 1.

Figure 2:
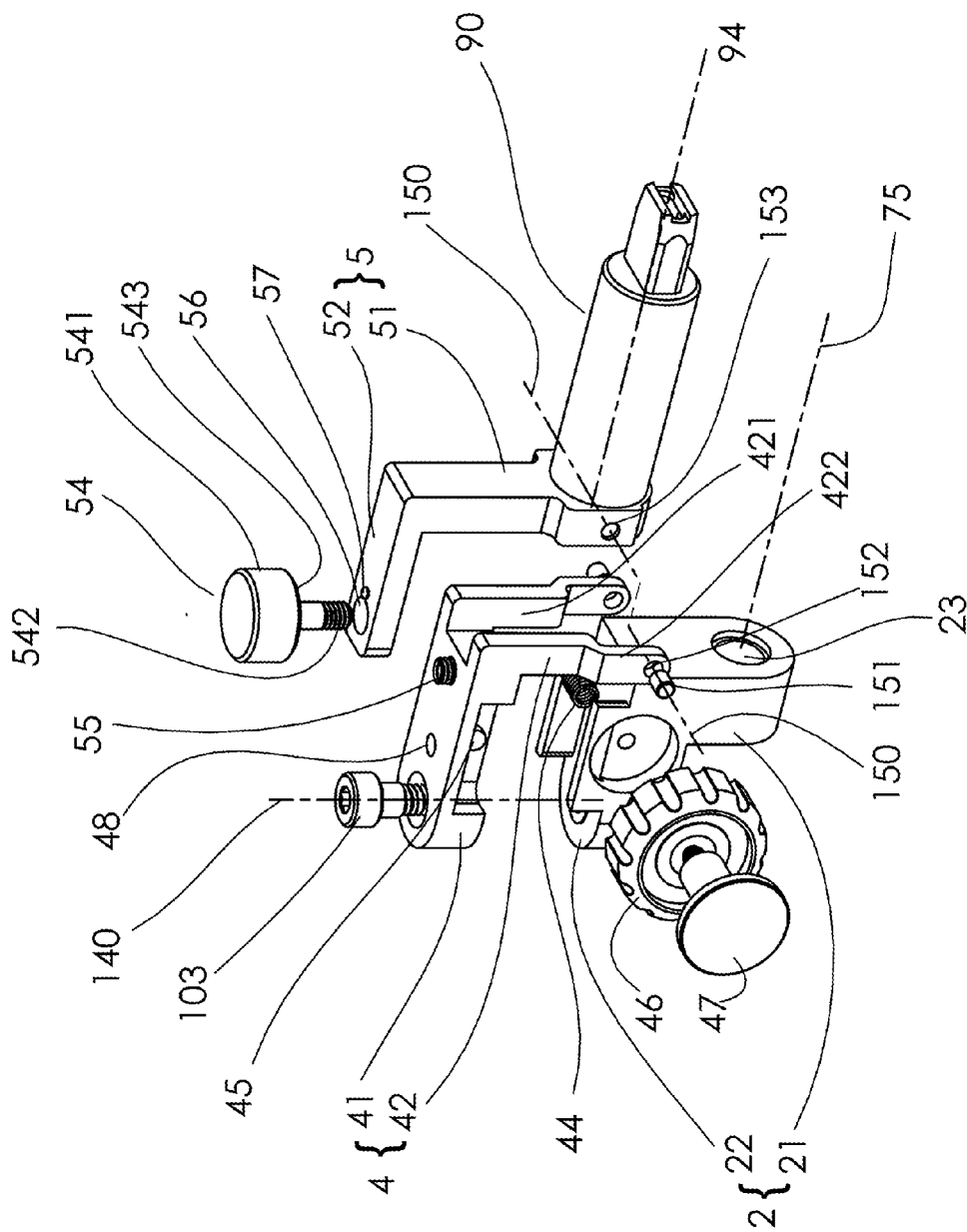
FIG. 2 and FIG. 3 show two exploded view of the adaptive device shown in FIG. 1, from two different angles.
Figure 3:
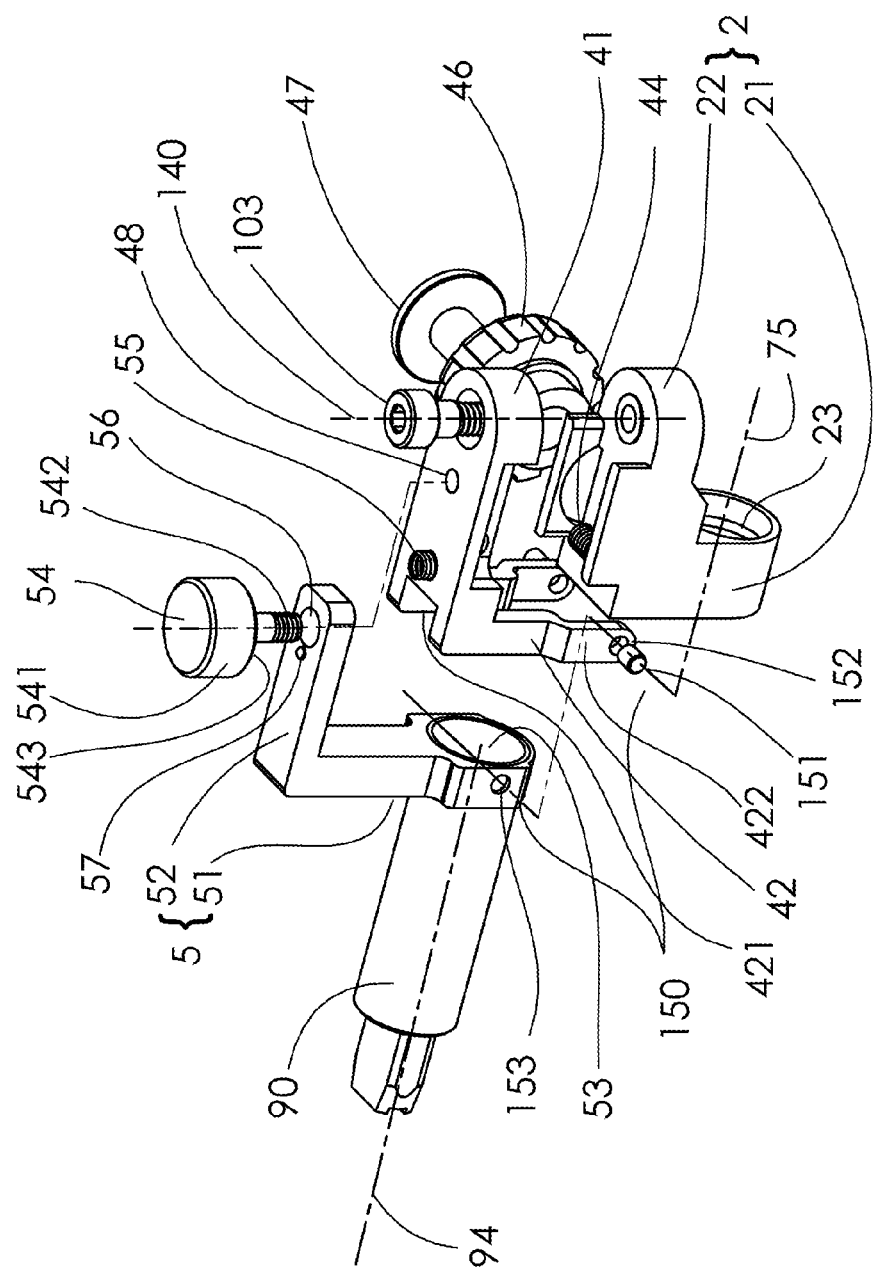

FIG. 2 and FIG. 3 show two exploded views of the adaptive device 10 as shown in FIG. 1 from two different angles. As illustrated in FIGS. 1-3, the adaptive device 10 comprises a supporting body 2, a first swinging structure 4 including a first swinging lever 41 and a first connecting piece 42, a second swinging structure 5 including a second swinging level 51 and optionally a second connecting piece 52, and a fitting tip 90. The adaptive device 10 further comprises a first biasing means (such as a spring 44) and a first adjustment driver (such as a bevel wheel 46) for shifting the imaging axis 75 horizontally, and a second biasing means (such as a compression spring 55) and a second adjustment driver (such as an adjustment knob 54) for shifting the imaging axis vertically. These components will be described below in detail in conjunction with the drawings.

The supporting body 2 has a first portion 21 and a second portion 22. The first portion 21 has a rear end adapted for receiving the optical tube 72 of a microscope 70, and a passageway 23 extending from the rear end to the front end of the first portion 21, such that the imaging axis 75 of the microscope 70 passes through the passageway 23. The second portion 22 is disposed above the first portion 21 and extends rearwards over the optical tube 72 of the microscope 70 received in the rear end of the first portion 21.

The first swinging structure 4 comprises a first swinging lever 41 and a first connecting piece 42. The rear end of the first swinging lever 41 is rotatably mounted to the second portion 22 of the supporting body 2 with a bolt 103, such that the first swinging lever 41 is rotatable relative to the supporting body 2 about a first swinging axis 140 that is perpendicular or substantially perpendicular to the imaging axis 75 of the microscope 70.

The first connecting piece 42 is connected to the front end of the first swinging lever 41 and extends, in front of the supporting body 2, from the front end of the first swinging lever 41 towards the imaging axis 75 of the microscope 70.

As illustrated in FIG. 2, the first connecting portion 42 has a recess 421 formed on a front side thereof and two prongs 422 at the lower end. The second swinging lever 51 is pivotally mounted to the two prongs 422 and received in the recess 421 of the first connecting piece 42 with a pair of pivots (or pins) 151, such that the second swinging lever 51 is rotatable about a second swinging axis 150. Roughly speaking, the second swinging axis 150 is perpendicular or substantially perpendicular to the first swinging axis 140. More precisely, the second swinging axis 150 is perpendicular or substantially perpendicular to any line that parallels the first swinging axis 140 and intersects the second swinging axis 150, or equivalently, the second swinging axis 150 is parallel or substantially parallel to a normal plane of the first swinging axis 140.

In the preferred embodiment shown in FIGS. 1-3, two through holes 152 are respectively cut through the two prongs 422 of the first connecting piece 42, and two receiving holes 153 are respectively disposed on two lateral sides of the second swinging lever 51. As shown, the second swinging axis 150 passes through the center of the two pivots 151, which are inserted through the two through holes 152 and into the two receiving holes 153 on the second swinging lever 51. In FIGS. 1-3, the two through holes 152, the two receiving holes 153, and therefore the second swinging axis 150 are disposed at about the same level as the imaging axis 75 of the microscope 70. However, for the adaptive device 10 of the present invention to work, the second swinging lever 51 need not be pivoted at that level. In fact, the second swinging lever 51 may be pivoted at a level higher or lower than the imaging axis 75, as long as the second swinging lever 51 has enough room to swing forward or backward relative to the first connecting piece 42. For example, the second swinging lever 51 may be pivoted at a level higher than the fitting tip 90 by having the two through holes 152 formed on the first connecting piece 42 at a higher level and the corresponding receiving holes 153 formed on the second swinging lever 51 higher than the fitting tip 90.

The second swinging lever 51 has a passageway 53 cut through the lower end thereof. The passageway 53 of the second swinging lever 51 is aligned with the passageway 23 of the supporting body 2 for the imaging axis 75 of the microscope 70 to pass through. In the embodiment shown in FIGS. 1-3, the second connecting piece 52 of the second swinging structure 5 extends rearwards from the second swinging lever 51. The rear end of the second connecting piece 52 is movably mounted to the top side of the first swinging lever 41.

The fitting tip 90 is attached to the front side of the lower end of the second swinging lever 51 and adapted for interfacing, usually through a connector adaptor 92 (as shown in FIG. 1), with a multi-row connector 30. The fitting tip 90 has an interior channel disposed to substantially align with the passageway 53 of the second swinging lever 51 and the passageway 23 of the supporting body 2, allowing the imaging axis 75 of the microscope 70 to pass through to intersect with the endfaces of the multi-row connector 30. The center axis 94 of the fitting tip 90 is defined as the straight line passing through the center of the interior channel of the fitting tip 90.

Figure 4:
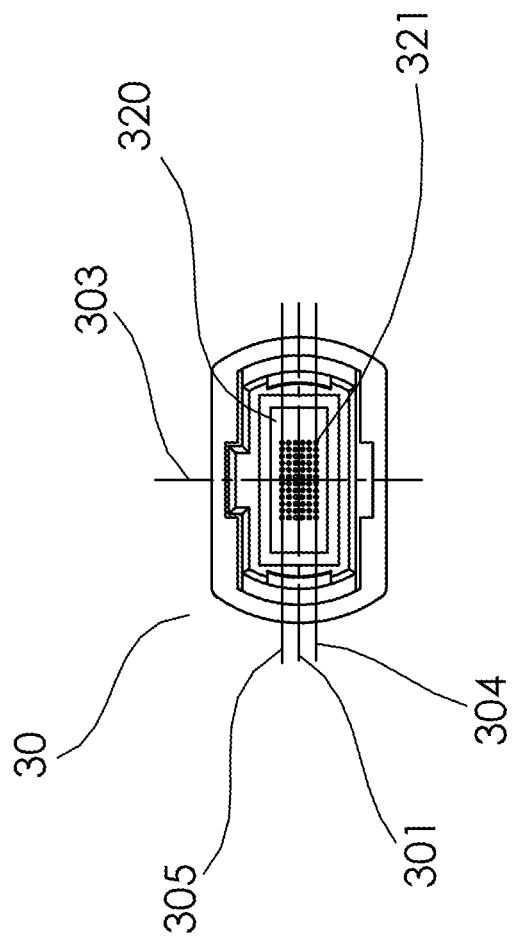
FIG. 4 illustrates the ferrule surface of a fiber-optic connector having multiple rows of endfaces.

FIG. 4 illustrates the endfaces 321 of a multi-row connector 30 with the endfaces 321 arranged in multiple rows. The front end surface of the multi-row connector 30 constitutes a ferrule surface 320. The endfaces 321 are coplanar with the ferrule surface 320. The horizontal line equidistant from the top row and the bottom row of endfaces on the ferrule surface 320 is denoted by 301, and the vertical line equidistant from the rightmost column and the leftmost column of endfaces on the ferrule surface 320 is denoted by 303. The top row and the bottom row of endfaces are delimited by the top horizontal line 305 and the bottom horizontal line 304, respectively.

Accordingly, one can view through the microscope 70 unobstructed along the imaging axis 75, from the optical tube 72 of the microscope 70, through the passageway 23 of the supporting body 2, the passageway 53 of the second swinging lever 51 and the interior channel of the fitting tip 90, to the endfaces 321 of the multi-row connector 30.

When the first swinging lever 41 is caused to swing about the first swinging axis 140, the first connecting piece 42 will swing sideways, along with the second swinging lever 51 and the fitting tip 90, relative to the supporting body 2 and the optical tube 72 of the microscope 70. As a result, the fitting tip 90 will swing sideways (left and right) relative to the imaging axis 75 of the microscope 70, thus allowing the imaging axis 75 to be selectively aligned with any horizontal point on the ferrule surface 320 of the multi-row connector 30.

Thus, when the second swinging lever 51 is caused to swing about the second swinging axis 150, the second swinging lever 51 will tilt back and forth, along with the fitting tip 90, relative to the first swinging structure 4, the supporting body 2, and the optical tube 72 of the microscope 70. As a result, the fitting tip 90 will tilt upwards or downwards relative to the imaging axis 75 of the microscope 70, thus allowing the imaging axis 75 to be selectively aligned with any vertical point on the ferrule surface 320 of the multi-row connector 30.

Therefore, using the first swinging lever 41 to shift the imaging axis 75 "horizontally" (more precisely, in a direction parallel to the rows of endfaces) and the second swinging lever 51 to shift the imaging axis 75 "vertically" (more precisely, in a direction perpendicular to the rows of endfaces), the imaging axis 75 can be selectively aligned with any endface on the ferrule surface 320 of the multi-row connector 30 for inspection.

In the embodiment shown in FIGS. 1-3, the first swinging lever 41 has a flat top and is substantially parallel to the optical tube 72 of the microscope 70; the first connecting piece 42 is straight and is disposed at a substantially right angle with the flat top of the first swinging lever 41. However, the first swinging lever 41 and the first connecting piece 42 are not limited to these shapes or relative angle between the two, as long as the first swinging axis 140 is substantially perpendicular to the imaging axis 75. In addition, the first swinging lever 41 and the first connecting piece 42 can be either integrally formed (in one piece) or formed of two or more pieces physically joined or connected together.

As shown in FIGS. 1-3, the first swinging lever 41 is rotatably mounted on the second portion 22 of the supporting body 2 with a bolt 103. However, any other hinging means known in the art would work equally well. Moreover, the supporting body 2 as shown in the drawings has a vertical (i.e. relative to the optical tube) front surface, and the second swinging lever 51 has a corresponding vertical rear surface facing the front surface of the supporting body 2. However, they are not limited to these configurations as long as the two are substantially close to each other without obstructing the swinging of the second swinging lever 51 relative to the supporting body 2.

As shown in FIG. 2 and FIG. 3, a bevel wheel 46 is mounted on a wheel shaft 47 fastened to one side of the supporting body 2. The structure of the bevel wheel 46 is further illustrated in FIGS. 5A-5D. FIG. 5D is a perspective view of the bevel wheel 46, which has on its inner side a center portion 125 enclosing the center hole 126 and an annular projection with an annular slanted surface 121 around the center portion 125. The center portion 125 projects further than the highest point H of the annular slanted surface 121—as measured from the base of the annular projection—so that the bevel wheel 46 is allowed to turn freely around the wheel shaft 47. FIG. 5A shows a lateral elevation view of the bevel wheel 46, showing the highest point H and the lowest point L of the slanted surface 121. FIG. 5B shows another lateral elevation view of the bevel wheel 46, showing the lowest point L of the slanted surface 121. FIG. 5C shows a plan view of the bevel wheel 46 from the outer side 127. Admittedly, the structure of a bevel wheel as described above and other functional equivalents are well-known to one of ordinary skill in the relevant art. The operation of the bevel wheel 46 is also described in detail in U.S. Pat. No. 8,104,976. Therefore, no further description is needed.

Figure 6:
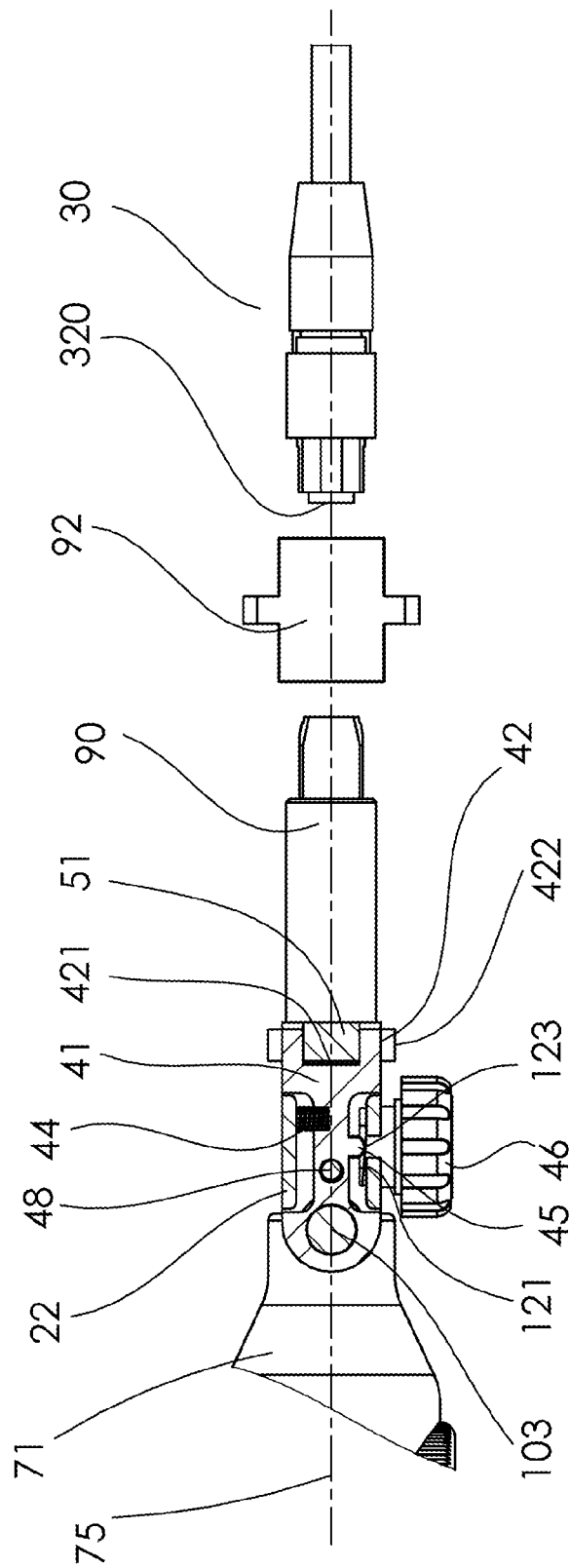
FIG. 6 shows a top plan view of the assembled adaptive device in FIG. 1 with a top section of the first swinging lever and the second connecting piece removed to illustrate the operation of the bevel wheel in shifting the imaging axis horizontally.

As shown in FIGS. 2, 3 and 6, a bulge 45 is formed on an internal wall of the first swinging lever 41. The bulge 45 is disposed to be in contact with the slanted surface 121 of the bevel wheel 46 at a point 123. A first biasing means, such as a spring 44, is disposed between the top side of the supporting body 2 and the first swinging lever 41 to constantly exert an elastic force to push the first swinging lever 41 towards the slanted surface 121 of the bevel wheel 46 relative to the supporting body 2, thus pushing the bulge 45 against the slanted surface 121 of the bevel wheel 46. The details and variations in the structure of the first biasing means 44 and the bulge 45 can be found in U.S. Pat. No. 8,104,976 and will not be repeated here.

The operation and function of the first swinging lever 41 in conjunction with the bevel wheel 46, the bulge 45 and the spring 44 in shifting the first swinging lever 41 having been described in detail in U.S. Pat. No. 8,104,976, only a brief summary will be provided below. FIG. 6 shows a top plan view of the assembled adaptive device 10 in FIGS. 1-3 with a top section of the first swinging lever 41 and the second connecting piece 52 removed to illustrate the interaction among its internal components. In FIG. 6, the point of contact 123 between the slanted surface 121 and the bulge 45 is at an intermediate point between the highest point H and the lowest point L; at this point, the imaging axis 75 is aligned with the middle vertical line 303 on the ferrule surface 320. Provided that the fitting tip 90 is also held horizontally by the second swinging lever 51, the imaging axis will coincide with the center axis 94 of the fitting tip 90 and align with the intersection between the middle vertical line 303 and the middle horizontal line 301 on the ferrule surface 320. When the point of contact 123 between the slanted surface 121 and the bulge 45 is at the highest point H of the slanted surface 121, the fitting tip 90 is at its leftmost point relative to the imaging axis 75. If the fitting tip 90 is connected to a stationary multi-row connector 30, the imaging axis 75 is actually shifted to the rightmost point relative to the ferrule surface 320. On the other hand, when the point of contact 123 is at the lowest point L of the slanted surface 121, the fitting tip 90 is at its rightmost point relative to the imaging axis 75 and, if the fitting tip 90 is connected to a stationary multi-row connector 30, the imaging axis 75 is actually shifted to the leftmost point relative to the ferrule surface 320. Thus, all the endfaces between the two farthest points may be selectively aligned and inspected. Note that the imaging axis 75 is shifted from side to side relative to the fitting tip 90 along a straight-line track on the ferrule surface 320 as the bevel wheel 46 is being turned around.

The adjustment of the extent of swinging of the second swinging lever 51 will be described below. As illustrated in FIG. 2 and FIG. 3, a through hole 56 is formed near the rear end of the second connecting piece 52. An adjustment knob 54 comprises a knob 541 with a flat base surface 543, and a threaded bolt 542 extending from the center of the base surface 543. The second connecting piece 52 is movably mounted to the first swinging lever 41 with the threaded bolt 542 of the adjustment knob 54 passing through the through hole 56 of the second connecting piece 52 and adjustably screwed into a matching threaded hole 48 formed on the first swinging lever 41. The through hole 56 should be made sufficiently large to allow the threaded bolt 542 to move freely relative to the through hole 56 when the threaded bolt 542 is screwed further in or out of the matching threaded hole 48 to adjust the clearance between the second connecting piece 52 and the first swinging lever 41. When the threaded bolt 542 is screwed into the threaded hole 48, the base surface 543 of the knob 541 contacts the top surface of the second connecting piece 52 and stop the second swinging lever 51 and the second connecting piece 52 from swinging forward. Further, a second biasing means, such as a compression spring 55, is disposed near the front end of the first swinging lever 41 to push at the bottom side of the second connecting piece 52 upwards against the base surface 543 of the knob 541, thus pushing to tilt the second swinging lever 51 forward about the second swinging axis 150. The through hole 56 of the second connecting piece 52 should be slightly wider than the threaded bolt 542 to provide enough clearance for the second connecting piece 52 to swing with the second swinging lever 51 when the adjustment knob 54 is being adjusted.

Therefore, by adjusting the adjustment knob 54 to control the gap between the bottom side of the second connecting piece 52 and the top side of the first swinging lever 41, one can adjust the swinging angle of the second swinging lever 51, and therefore the swinging angle (relative to the imaging axis 75) of the fitting tip 90 connected to the second swinging lever 51. Consequently, when the adjustment knob 54 is adjusted, the second connecting piece 52 is titled together with the second swinging lever 51 about the second swinging axis 150, and the fitting tip 90 is tilted upwards (when the adjustment knob 54 is tightened) or downwards (when the adjustment knob 54 is loosened), all relative to the supporting body 2 and the optical tube 72 of the microscope 70. As the fitting tip 90 is tilted upwards relative to the optical tube 72 of the microscope 70, the imaging axis 75 may be aligned with the lower rows of the endfaces 321, and as the fitting tip 90 is tilted downwards relative to the optical tube 72 of the microscope 70, the imaging axis 75 may be aligned with the upper rows of the endfaces 321.

Optionally a bulge 57 may be formed on the top surface of the second connecting piece 52 near the through hole 56 of the second connecting piece 52 to be in contact with the base surface 543 of the knob 541. Thus, when the adjustment knob 54 is tightened, the bulge 57 will be pushed downwards; when the adjustment knob 54 is loosened, the bulge 57 will rise upwards against the base surface 543 of the knob 541.

In FIG. 2 and FIG. 3, a compression spring 55 is used as the second biasing means for biasing the second connecting piece 52 and the adjustment knob 54 is used as the specific adjustment driver. However, other biasing means and other types of adjustment drivers may be used. For example, instead of the compression spring 55, a spring sheet may be used instead.

Figure 7A:
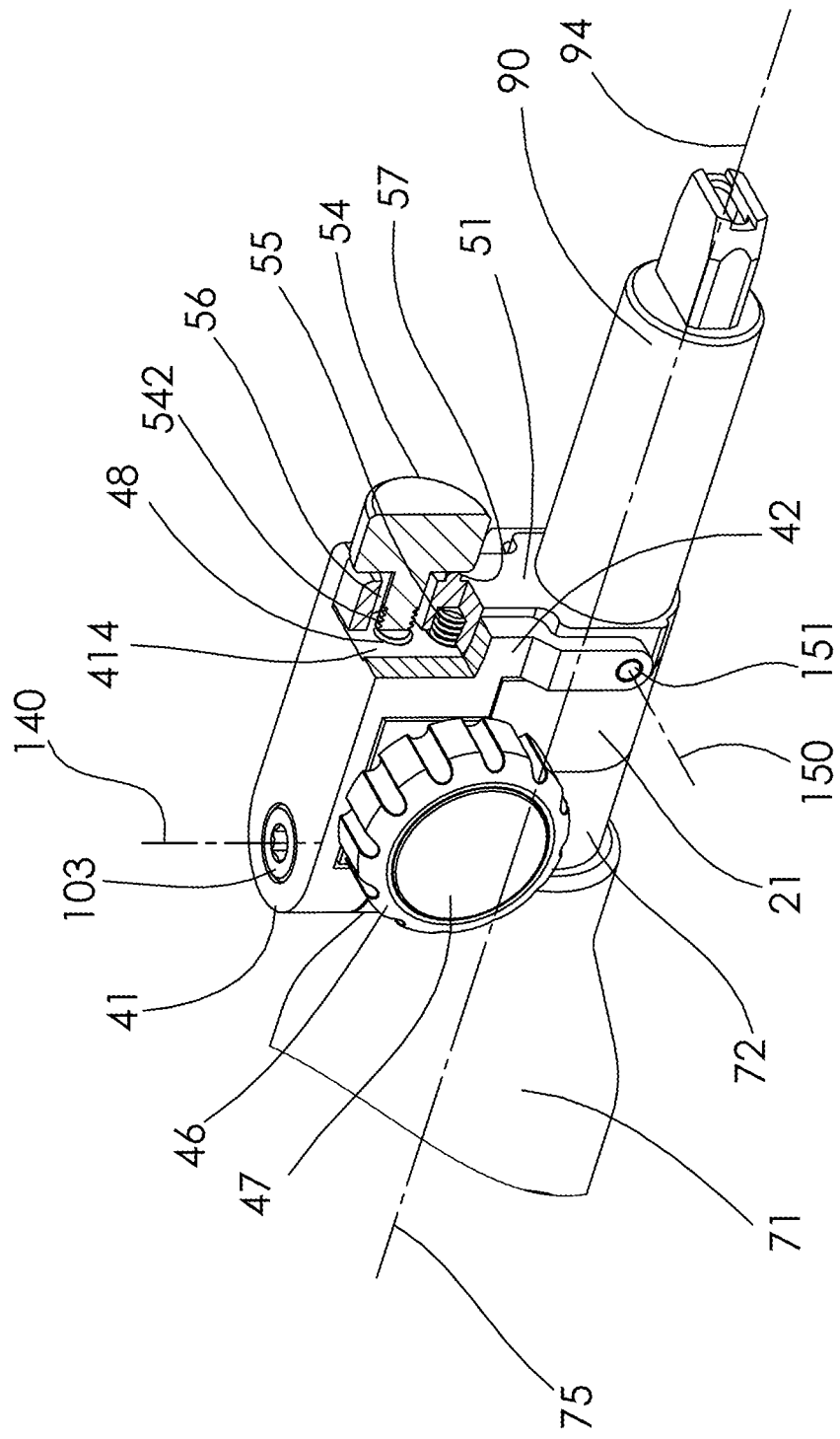
FIG. 7A and FIG. 7B illustrate two variations of the embodiment shown in FIGS. 1-3.

In FIG. 2 and FIG. 3, the compression spring 55 is fixed to the top side of the first swinging lever 41 and the adjustment knob 54 is screwed into the threaded hole 48 on the top side of the first swinging lever 41. Alternatively, as illustrated in FIG. 7A, the adaptive device 10 can work without the second connecting piece 52 by having a through hole 56 formed on the upper end of the second swinging lever 51 and fixing a compression spring 55 on the base 414 of the recess 421 of the first connecting piece 42. Correspondingly, the threaded bolt 542 of the adjustment knob 54 extends through a through hole 56 of the second swinging lever 51 to be screwed into a threaded hole 48 on the base 414 of the recess 421 of the first connecting piece 42. In comparison, the embodiment with the second connecting piece 52, as shown in FIG. 2 and FIG. 3 is more convenient for a user to turn the adjustment knob 54. In general terms, the second biasing means 55 may be disposed between the second swinging structure 5 and the first swinging structure 4.

Figure 7B:
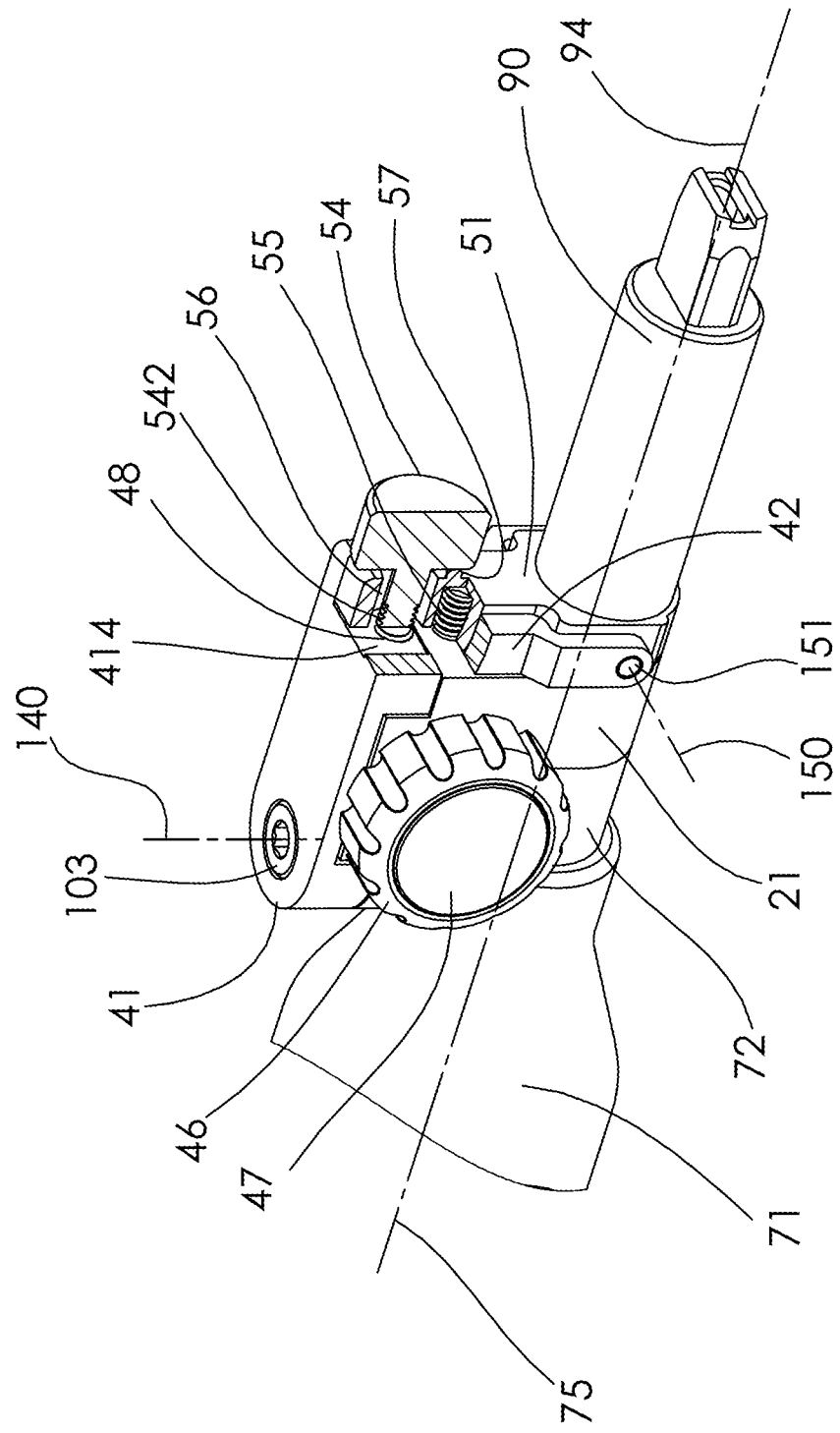

Alternatively, as illustrated in FIG. 7B, the compression spring 55 may be fixed on the front surface of the supporting body 2 instead of the base 414 of the recess 421 of the first connecting piece 42. In other words, the second biasing means 55 may be disposed between the second swinging structure 5 and the supporting body 2.

Figure 8A:
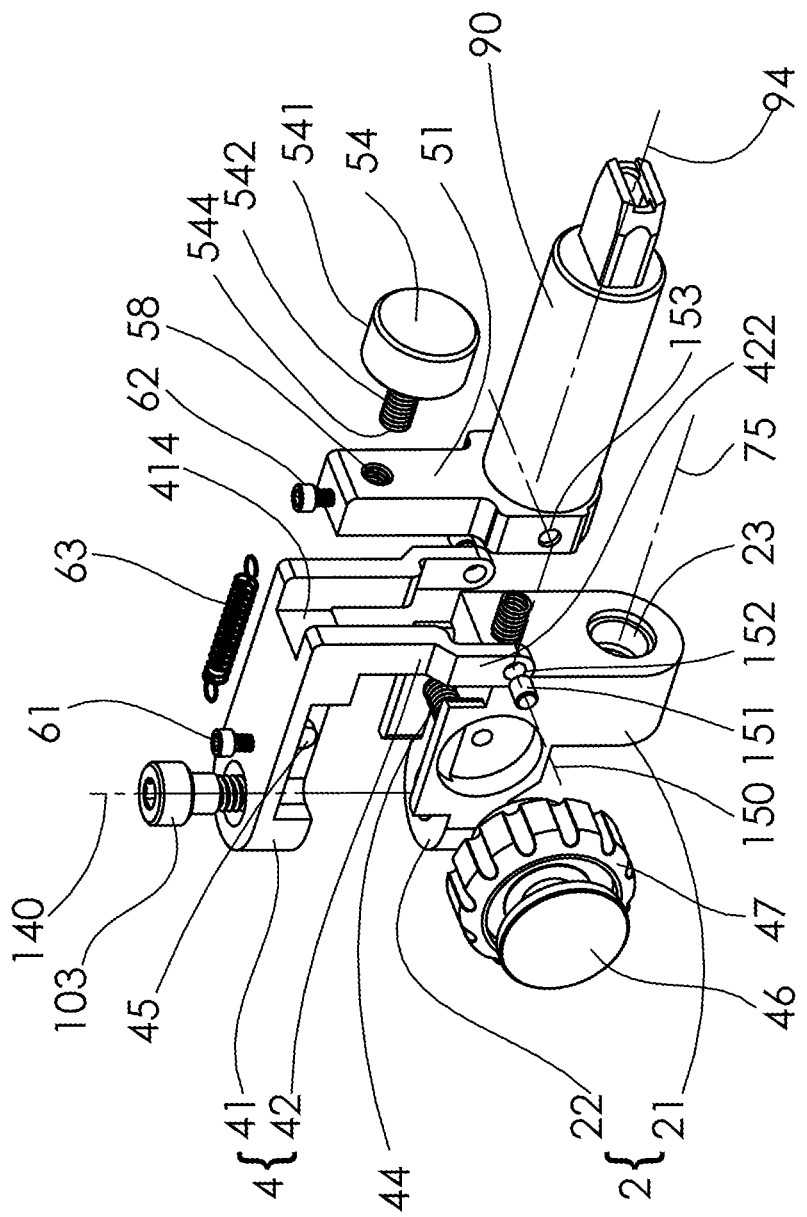
FIG. 8A shows another preferred embodiment of the adaptive device according to the present invention.
Figure 8B:
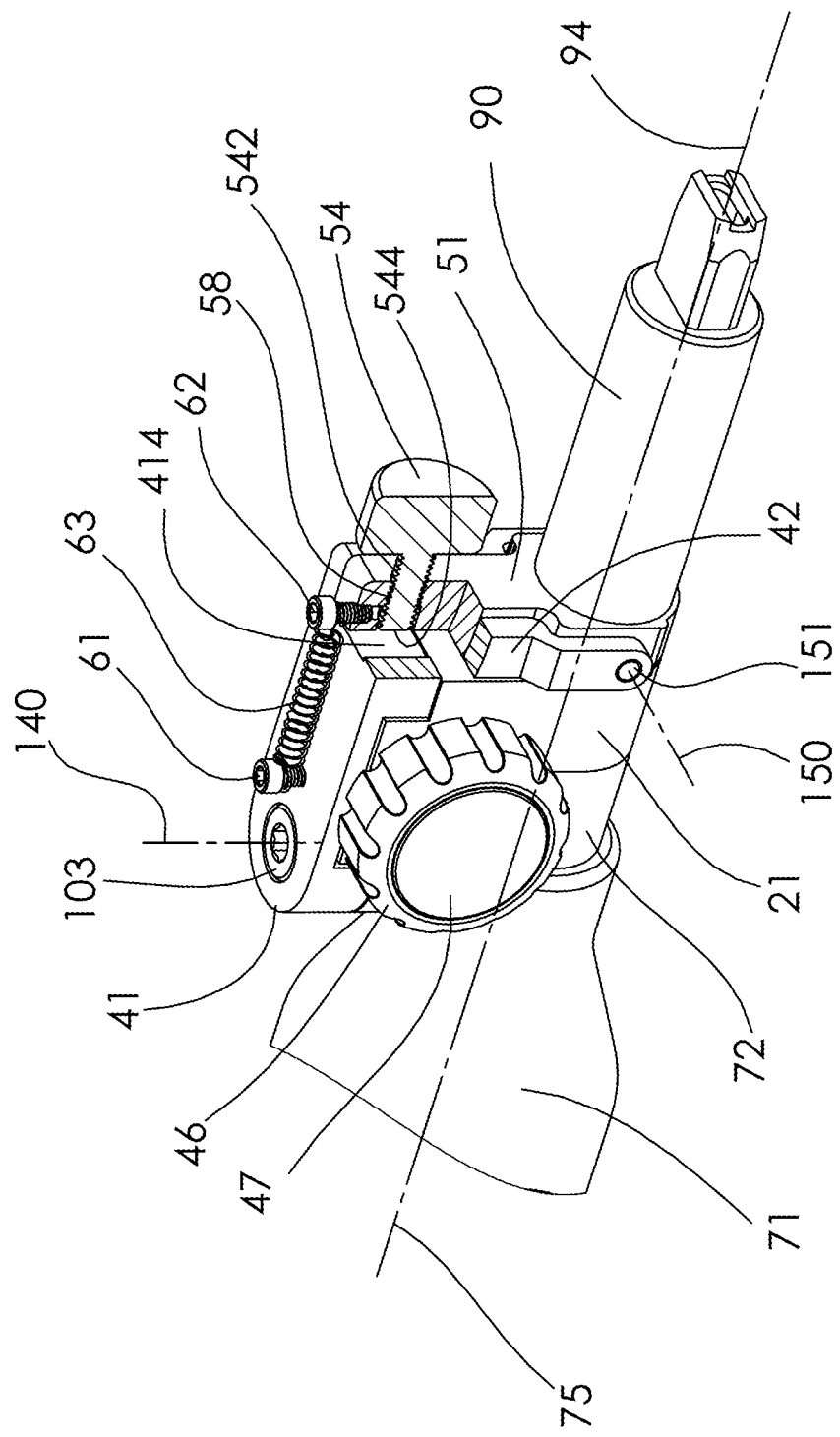
FIG. 8B shows the embodiment in FIG. 8A with a portion cut to illustrate the operation of the adjustment knob in shifting the imaging axis vertically.

FIG. 8A and FIG. 8B illustrate another preferred embodiment for adjusting the extent of swinging of the second swinging lever 51. In this embodiment, a threaded through hole 58 is formed on the upper end of the second swinging lever 51, and an extension spring 63 is held between two screws 61 and 62 (or other fixing means) mounted respectively on the top side of the first swinging lever 41 and the top side of the second swinging lever 51. The second connecting piece 52 is not needed, therefore is not part of the second swinging structure 5. The adjustment knob 54 is fixed to the second swinging lever 51 with the threaded bolt 542 screwed through and the threaded through hole 58. The end surface 544 of the threaded bolt 542 protrudes out of the threaded through hole 58 to be in contact with the base 414 of the recess 421 of the first connecting piece 42. Thus, when the adjustment knob 54 is screwed further into the threaded through hole 58, the extension spring 63 will be further extended, and the second swinging lever 51 will tilt forward and the fitting tip 90 will tilt downwards, causing the imaging axis 75 to move upwards relative to the ferrule surface 320 of the multi-row connector 30 connected to the fitting tip 90. Conversely, when the adjustment knob 54 is turned further out of the threaded through hole 58, the extension spring 63 will be less extended, and the second swinging lever 51 will tilt backwards and the fitting tip 90 will tilt upwards, causing the imaging axis 75 to move downwards relative to the ferrule surface 320 of the multi-row connector 30. In an actual adaptive device, the extension spring 63 and the two screws will be covered and not visible from outside.

Figure 11A:
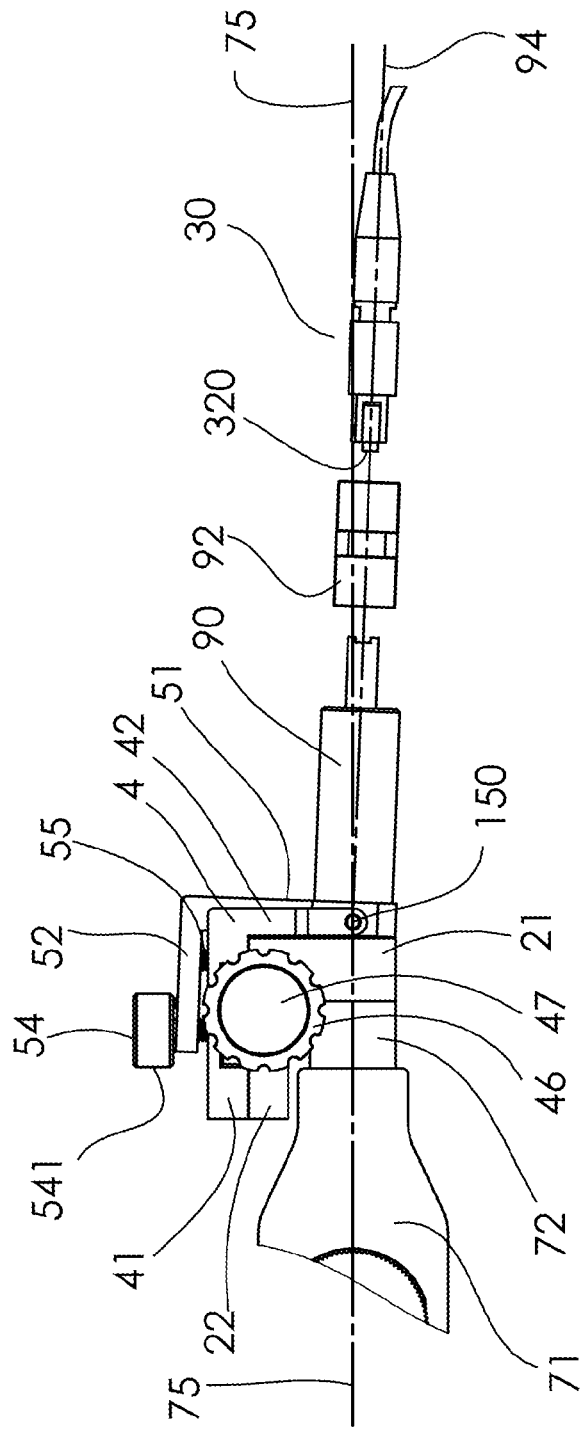
Figure 11B:
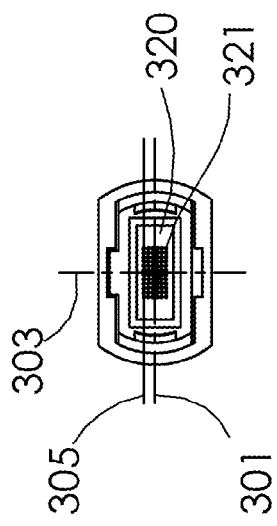

FIGS. 9-11 further illustrate the operation of the adaptive device 10 in adjusting the vertical alignment of the imaging axis 75 relative to the ferrule surface 320. As shown in FIG. 9A, the second swinging lever 51 is adjusted (by the adjustment knob 54) such that the center axis 94 of the fitting tip 90 and the imaging axis 75 of the microscope 70 are on the same (horizontal) plane. If at the same time the first swinging axis 41 is also adjusted (by the bevel wheel 46) to be parallel to the imaging axis 75, then the center axis 94 of the fitting tip 90 will be collinear with the imaging axis 75. When the fitting tip 90 is connected to a multi-row connector 30, the imaging axis 75 intersects the middle horizontal line 301 on the ferrule surface 320, as shown in FIG. 9B. Thus, the endfaces 321 of the middle row may be selectively aligned and inspected by shifting the first swinging lever 41 left or right. Further, as illustrated in FIG. 10A, when the adjustment knob 54 is tightened from the position in FIG. 9A to push down the rear end of the second connecting piece 52, the second swinging lever 51 will be shifted counterclockwise about the second swinging axis 150. Then the center axis 94 of the fitting tip 90 will be tilted upwards relative to the imaging axis 75, and the imaging axis 75 will intersect with the ferrule surface 320 at a point below the middle horizontal line 301 on the ferrule surface 320. Therefore, by adjusting the adjustment knob 54, every row of endfaces below the middle horizontal line 301 on the ferrule surface 320, including the bottom row next to the bottom horizontal line 304, as shown in FIG. 10B, may be selectively aligned with the imaging axis 75 and inspected by the microscope 70. Similarly, as illustrated in FIG. 11A, when the adjustment knob 54 is loosened from the position in FIG. 9A, the second swinging lever 51 will be shifted clockwise about the second swinging axis 150. Then the center axis 94 of the fitting tip 90 will be tilted downwards relative to the imaging axis 75, and the imaging axis 75 will intersect with the ferrule surface 320 at a point above the middle horizontal line 301 on the ferrule surface 320. Therefore, by adjusting the adjustment knob 54, every row of endfaces above the middle horizontal line 301 on the ferrule surface 320, including the top row of endfaces next to the top horizontal line 305, as shown in FIG. 11B, may be selectively aligned with the imaging axis 75 and inspected by the microscope 70. Therefore, when the adjustment knob 54 is adjusted to align the imaging axis 75 with a particular row of endfaces, every endface on that row be selectively aligned with the imaging axis 75 by adjusting the first swinging lever 41 of the first swinging structure 4 by means of the bevel wheel 46.

In the foregoing analysis, the second swinging lever 51, the second connecting piece 52, and the fitting tip 90 are tilted or swung together "relative to" the optical tube 72 of the microscope 70, therefore relative to the imaging axis 75. Thus, the second swinging lever 51, the second connecting piece 52, and the fitting tip 90 may all be stationary while the imaging axis 75 is tilted or swung, or vice versa. For example, when the multi-row connector 30 to be inspected is physically fixed in position (e.g. when the multi-row connector 30 is installed behind communication system backplates), the second swinging lever 51, the second connecting piece 52, and the fitting tip 90 will be fixed in position while the optical tube 72 and the imaging axis 75 are tilted up and down (together with the first swinging structure 4) about the second swinging axis 150 or swung left and right about the first swinging axis 140. On the other hand, if the multi-row connector 30 is movable, then the second swinging lever 51 and the second connecting piece 52 can be tilted up and down, and the first swinging structure 4 can be swung left and right along with the fitting tip 90. After all, it is the relative position between the imaging axis 75 and the fitting tip 90 of the adaptive device 10 that determines which of the endfaces is aligned with the imaging axis 75.

When the imaging axis 75 is shifted to move over the fiber-optic endfaces 321, the distance from the endfaces to the lens of the microscope 70 will change slightly. This minor effect can be easily compensated for by refocusing the image of each endface.

The invention is not to be limited to the exact structure and features shown in the accompanying drawings or described in the specification as various changes in the details of construction may be made without departing from the spirit of the invention.

What is claimed is:
1. A device for shifting the imaging axis of a microscope in two mutually perpendicular directions for inspecting individual endfaces of a fiber-optic connector having multiple rows of endfaces, the device comprising:
 a supporting body having a first portion and a second portion, wherein the first portion has a rear end adapted for receiving an optical tube of the microscope and a passageway extending from the rear end to a front end of the first portion, such that the imaging axis of the microscope is allowed to pass through the passageway, and the second portion is disposed above the first portion and extends rearwards over the optical tube of the microscope;
 a first swinging structure comprising a first swinging lever and a first connecting piece, wherein
  the first swinging lever has a rear end and a front end, wherein the rear end is rotatably mounted to the second portion of the supporting body, such that the first swinging lever is rotatable relative to the supporting body about a first swinging axis that is substantially perpendicular to the imaging axis of the microscope;
  the first connecting piece is connected to the front end of the first swinging lever and extends, in front of the supporting body, towards the imaging axis of the microscope, and
  a recess is formed on a front side of the first connecting piece;
 a second swinging structure comprising a second swinging lever and optionally a second connecting piece, wherein the second swinging lever is pivotally mounted to the first connecting piece and received in the recess of the first connecting piece, such that the second swinging lever is rotatable about a second swinging axis that is substantially parallel to a normal plane of the first swinging axis, wherein a passageway aligned with the passageway of the supporting body is cut through a lower end of the second swinging lever; and the optional second connecting piece is connected to an upper end of the second swinging lever and extending rearwards over the first swinging lever;

a fitting tip attached to a front side of the passageway of the second swinging lever and adapted for interfacing with a multi-fiber connector, the fitting tip having an interior channel aligned with the passageway of the second swinging lever, such that the imaging axis of the microscope is allowed to pass therethrough to intersect with fiber-optic endfaces of the multi-fiber connector;

a first biasing means disposed between the second portion of the supporting body and the first swinging lever for rotationally biasing the first swinging lever about the first swinging axis;

a first adjustment driver disposed to interface with the supporting body and the first swinging lever and adapted to swing the supporting body relative to the first swinging lever against the first biasing means, thus moving the imaging axis of the microscope relative to the fitting tip along a first straight trajectory over the fiber-optic endfaces of the multi-fiber connector interfaced with the fitting tip;

a second biasing means disposed between the second swinging structure and the first swinging structure or the supporting body for rotationally biasing the second swinging lever about the second swinging axis; and a second adjustment driver disposed to interface with the first swinging structure and the second swinging structure and adapted to swing the second swinging lever relative to the first swinging structure against the second biasing means, thus moving the imaging axis of the microscope relative to the fitting tip along a second straight trajectory over the fiber-optic endfaces of the multi-fiber connector interfaced with the fitting tip, wherein the second straight trajectory is substantially perpendicular to the first straight trajectory.

2. The device of claim 1, wherein the second portion of the supporting body has a recess for receiving the first swinging lever; the first biasing means comprises a spring fixed to a side wall of the recess of the second portion of the supporting body.

3. The device of claim 2, wherein the first adjustment driver comprises a bevel wheel with a slanted surface; the bevel wheel is rotatably fastened to the supporting body; and a bulge is formed on a lateral side of the first swinging lever for contacting the slanted surface of the bevel wheel.

4. The device of claim 3, wherein the slanted surface of the bevel wheel is flat or spiral.

5. The device of claim 1, wherein the first adjustment driver comprises a bevel wheel with a slanted surface; the bevel wheel is rotatably fastened to the supporting body; and a bulge is formed on a lateral side of the first swinging lever for contacting the slanted surface of the bevel wheel.

6. The device of claim 5, wherein the slanted surface of the bevel wheel is flat or spiral.

7. The device of claim 1, wherein the second biasing means comprises a compression spring or a spring sheet fixed to the front side of the first connecting piece.

8. The device of claim 7, wherein the second adjustment driver comprises an adjustment knob having a knob with a flat base surface and a threaded bolt extending from a center portion of the base surface, wherein the threaded bolt passes through a through hole formed in the second swinging lever and is adjustably screwed into the front side of the first connecting piece.

9. The device of claim 8, further comprising a bulge formed on the front side of the second swinging lever to interact with the base surface of the knob of the adjustment knob.

10. The device of claim 1, wherein the second biasing means comprises a compression spring or a spring sheet fixed to a top side of the first swinging lever; and the second adjustment driver comprises an adjustment knob having a knob with a flat base surface and a threaded bolt extending from a center portion of the base surface, wherein the threaded bolt passes through a through hole formed in the second connecting piece and is adjustably screwed into the top side of the first swinging lever.

11. The device of claim 10, further comprising a bulge formed on the top side of the second connecting piece to interact with the base surface of the knob of the adjustment knob.

12. The device of claim 3, wherein the second biasing means comprises a compression spring or a spring sheet fixed to a top side of the first swinging lever; and the second adjustment driver comprises an adjustment knob having a knob with a flat base surface and a threaded bolt extending from a center portion of the base surface, wherein the threaded bolt passes through a through hole formed in the second connecting piece and is adjustably screwed into the top side of the first swinging lever.

13. The device of claim 12, further comprising a bulge formed on the top side of the second connecting piece to interact with the base surface of the knob of the adjustment knob.

14. The device of claim 1, wherein the second adjustment driver comprises an adjustment knob having a knob with a flat base surface and a threaded bolt extending from a center portion of the base surface, wherein the threaded bolt is screwed through a matching threaded through hole formed in the second swinging lever and has a distal end protruding out of the second swinging lever; and the second biasing means comprises an extension spring held between a point on the second swinging lever and a point on a top side of the first swinging lever to keep the distal end of the threaded bolt of the adjustment knob in contact with a base of the recess of the first connecting piece.

15. The device of claim 3, wherein the second adjustment driver comprises an adjustment knob having a knob with a flat base surface and a threaded bolt extending from a center portion of the base surface, wherein the threaded bolt is screwed through a matching threaded through hole formed in the second swinging lever and has a distal end protruding out of the second swinging lever; and the second biasing means comprises an extension spring held between a point on the second swinging lever and a point on a top side of the first swinging lever to keep the distal end of the threaded bolt of the adjustment knob in contact with a base of the recess of the first connecting piece.

16. The device of claim 1, wherein the second biasing means comprises a compression spring or a spring sheet fixed to a front surface of the supporting body, and the second adjustment driver comprises an adjustment knob having a knob with a flat base surface and a threaded bolt extending from a center portion of the base surface, wherein the threaded bolt passes through a through hole formed in the second swinging lever and is adjustably screwed into the front side of the first connecting piece.

17. The device of claim 3, wherein the second biasing means comprises a compression spring or a spring sheet fixed to a front surface of the supporting body, and the second adjustment driver comprises an adjustment knob having a knob with a flat base surface and a threaded bolt extending from a center portion of the base surface, wherein the threaded bolt passes through a through hole formed in the second swinging lever and is adjustably screwed into the front side of the first connecting piece.

18. The device of claim 17, further comprising a bulge formed on the front side of the second swinging lever to interact with the base surface of the knob of the adjustment knob.

* * * * *